(12) United States Patent
Fisk et al.

(10) Patent No.: US 6,481,241 B1
(45) Date of Patent: Nov. 19, 2002

(54) ACCUMULATOR DESICCANT BAG AND METHOD OF ASSEMBLING

(75) Inventors: John Dale Fisk, Edon, OH (US); Stephen Troy Schroder, Warren, MI (US)

(73) Assignee: Automotive Fluid Systems, Inc., Troy, MI (US)

( * ) Notice: Subject to any disclaimer, the term of this patent is extended or adjusted under 35 U.S.C. 154(b) by 0 days.

(21) Appl. No.: 09/941,482

(22) Filed: Aug. 29, 2001

(51) Int. Cl.⁷ .......................... F25B 43/00; B01D 53/02
(52) U.S. Cl. ............... 62/503; 62/475; 96/121
(58) Field of Search .................. 62/474, 475, 503, 62/509, 85; 96/147, 153, 121; 55/507, 515, DIG. 26; 210/282

(56) References Cited

U.S. PATENT DOCUMENTS

| | | |
|---|---|---|
| 2,210,862 A | 8/1940 | Tronstad |
| 2,589,229 A | 3/1952 | Dauphinee |
| 2,925,171 A | 2/1960 | Eaton |
| 3,734,296 A | 5/1973 | Proctor et al. |
| 3,739,913 A | 6/1973 | Bogosian |
| 3,854,912 A | 12/1974 | Terrel et al. |
| 3,877,909 A | 4/1975 | Hansen |
| 4,116,649 A | 9/1978 | Cullen et al. |
| 4,187,695 A | 2/1980 | Schumacher |
| 4,199,960 A | 4/1980 | Adams et al. |
| 4,272,264 A | 6/1981 | Cullen et al. |
| 4,276,756 A | 7/1981 | Livesay |
| 4,291,548 A | 9/1981 | Livesay |
| 4,401,447 A | 8/1983 | Huber |
| 4,405,347 A | 9/1983 | Cullen et al. |
| 4,675,971 A | 6/1987 | Masserang |
| 4,911,739 A | 3/1990 | Cullen et al. |
| 5,177,982 A | 1/1993 | Plemens |
| 5,636,525 A | 6/1997 | Riemenschneider |
| 5,651,266 A | 7/1997 | Hutchison et al. |
| 5,746,065 A * | 5/1998 | Patel et al. .................. 62/503 |
| 5,802,868 A | 9/1998 | Riemenschneider |
| 5,827,359 A | 10/1998 | Dobson et al. |
| 5,837,039 A | 11/1998 | LeConey et al. |
| 5,906,112 A | 5/1999 | Amin et al. |
| 5,914,456 A | 6/1999 | LeConey et al. |
| 5,970,738 A | 10/1999 | DeNolf et al. |
| 5,987,915 A | 11/1999 | Incorvia et al. |
| 5,996,371 A | 12/1999 | Riemenschneider |
| 6,038,881 A | 3/2000 | Murray |
| 6,062,039 A | 5/2000 | Haramoto et al. |
| 6,083,303 A | 7/2000 | LeConey et al. |
| 6,083,305 A * | 7/2000 | LeConey et al. ............. 96/147 |
| 6,155,072 A | 12/2000 | Sullivan et al. |
| 6,205,809 B1 | 3/2001 | Incorvia et al. |

FOREIGN PATENT DOCUMENTS

WO     WO-99/30805 A1 * 6/1999

* cited by examiner

*Primary Examiner*—Chen-Wen Jiang
(74) *Attorney, Agent, or Firm*—Vanophem & Vanophem, P.C.

(57) ABSTRACT

An accumulator for an automotive air-conditioning system includes a suction tube having an inlet leg, an outlet leg, and a bight therebetween. A pickup filter is mounted to the bight of the suction tube and cooperates with a desiccant bag. The pickup filter has a clasp circumscribing a portion of the bight, wherein the clasp includes a flange extending therefrom. The pickup filter further has a screen filter body extending integrally and downwardly from the clasp. The desiccant bag includes a flap extending from one end, wherein the flap includes an aperture therethrough defining a locating edge at one end or side thereof. The aperture of the desiccant bag mounts over the pickup filter with the locating edge of the flap locating against a portion of the clasp of the pickup filter to assist in retaining the desiccant bag in position on the pickup filter.

22 Claims, 6 Drawing Sheets

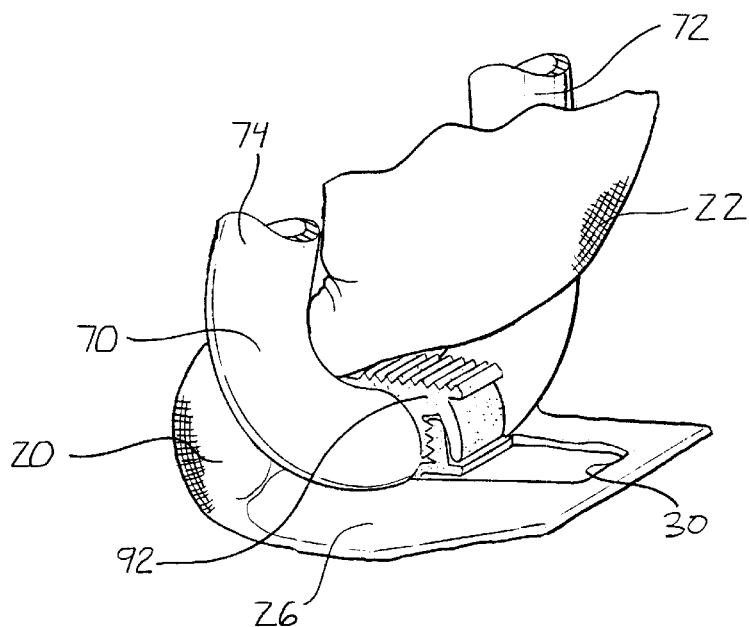
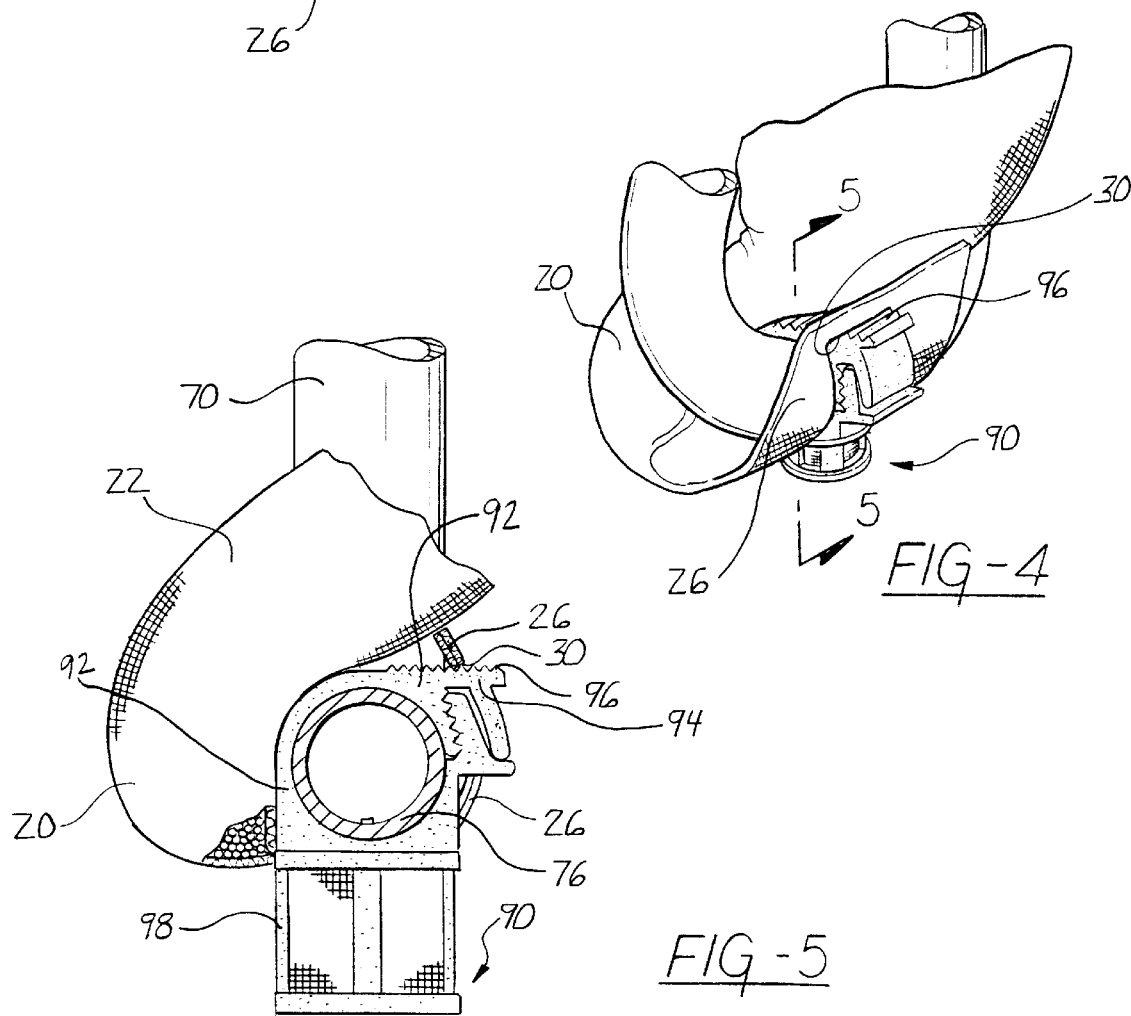

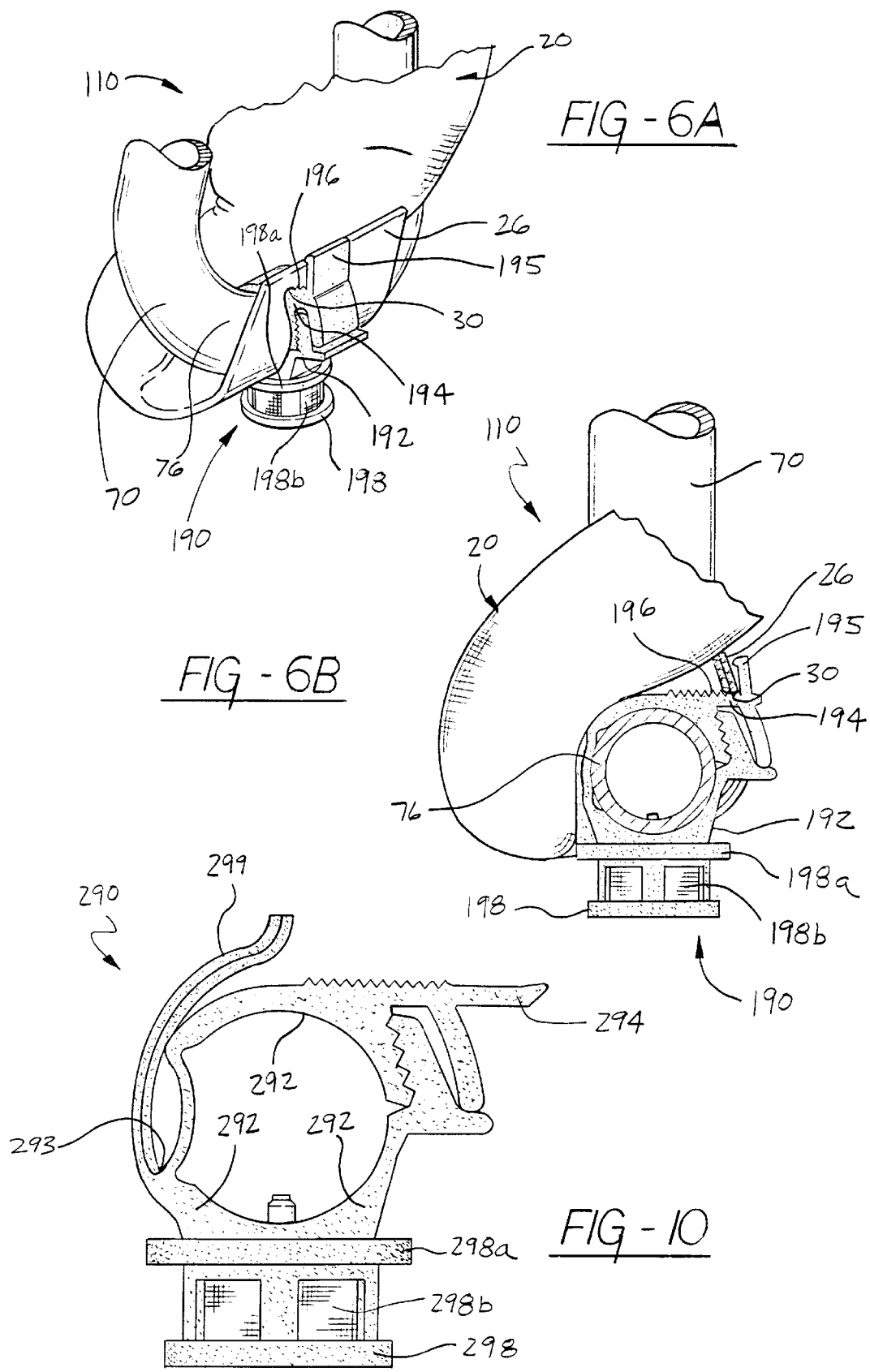

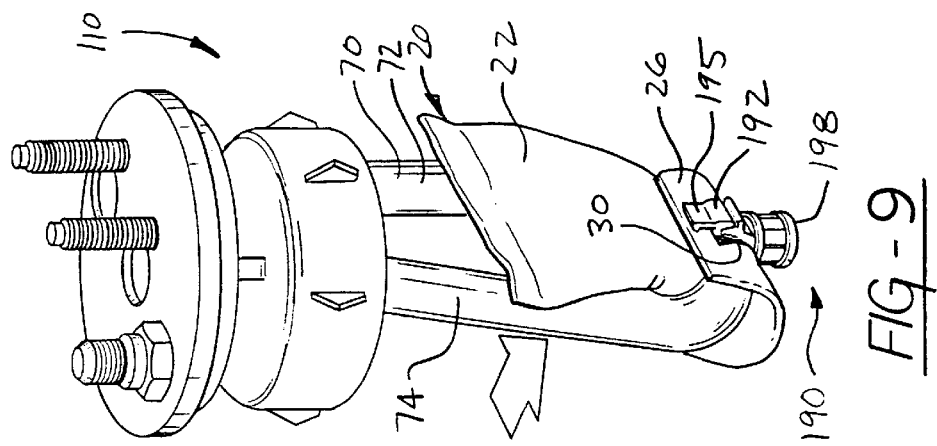
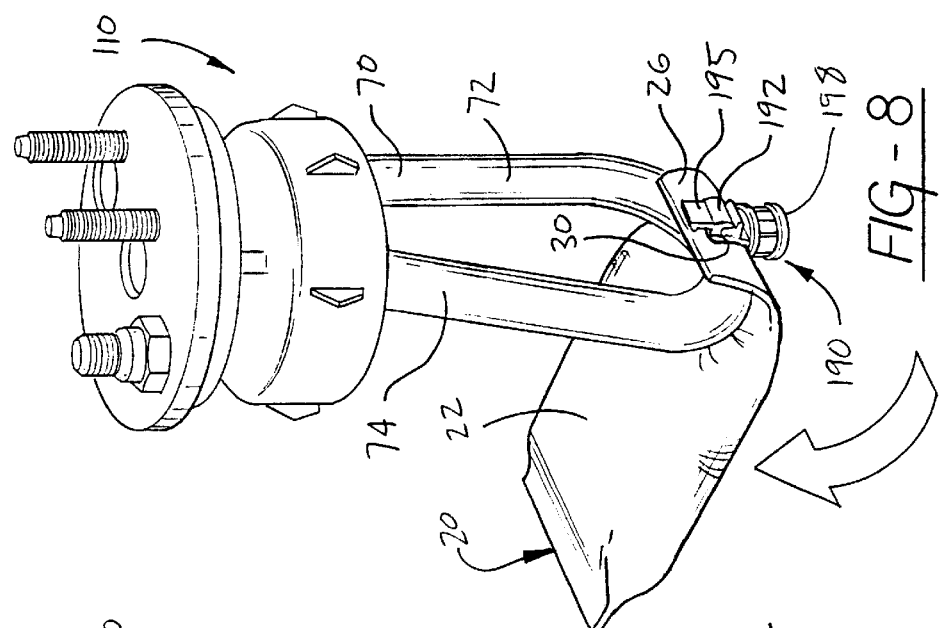
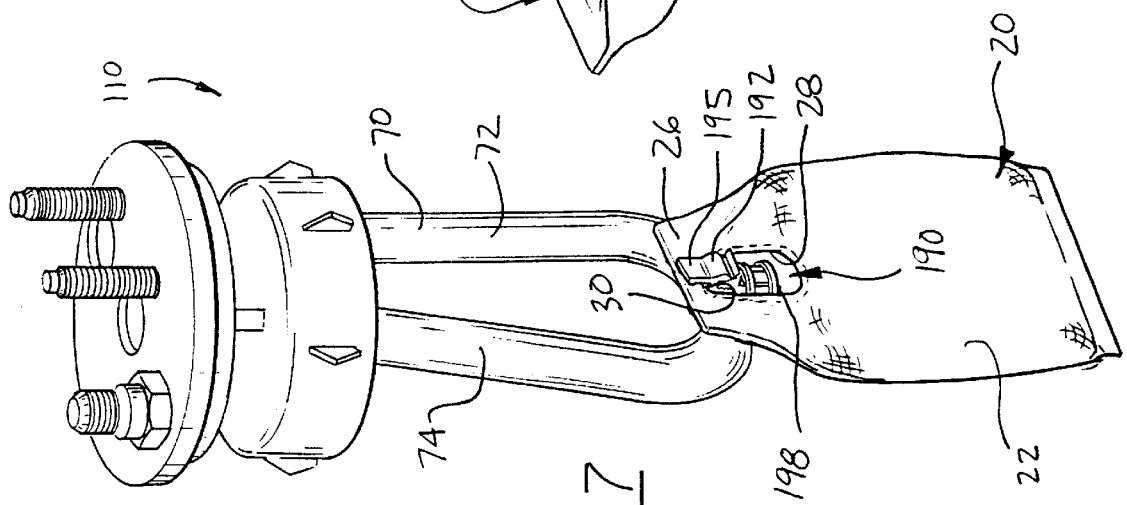

ACCUMULATOR DESICCANT BAG AND METHOD OF ASSEMBLING

BACKGROUND OF THE INVENTION

1. Field of the Invention

The present invention generally relates to adsorbent units for use with refrigeration system accumulators. More specifically, this invention relates to a desiccant bag for use with an automotive air-conditioning accumulator, wherein the desiccant bag integrally fastens to a suction tube assembly by locating against a clasp portion of an oil pickup filter that is mounted to a bight portion of the suction tube.

2. Description of the Related Art

It is common to place an adsorbent unit in an accumulator of a refrigeration system to adsorb moisture and impurities in the refrigerant. An accumulator typically includes a housing having a closed bottom end, and usually includes a J-shaped suction tube extending downwardly toward the closed bottom end of the housing.

Adsorbent units typically mount in some fashion to the "J-tube" and include a fabric bag having desiccant material therein. The fabric bag typically includes a flap extending from the bag and having an aperture therein. The aperture is usually placed over one end of the J-tube to secure the bag in place within the housing. For example, U.S. Pat. No. 4,116,649 to Cullen et al. teaches use of a self-retaining adsorbent bag for use with an accumulator. Cullen et al. disclose the bag as having a flexible flap with an aperture therein for mounting over the end of a conduit. The fit or difference in size between the diameter of the aperture and the diameter of the conduit is specified as 0.005" (0.127 mm). Such a tight fit makes it difficult to assemble the bag to the conduit.

Similarly, U.S. Pat. No. 5,802,868 to Riemenschneider teaches an improved saddle type adsorbent unit for use in a refrigerant receiver of an air-conditioning system. Riemenschneider discloses a refrigerant accumulator having a housing with a bottom wall, a sidewall, and a U-shaped pipe having a return bend adjacent the bottom wall and having first and second pipe portions extending upwardly from the return bend along the sidewall. A filter body extends downwardly from the return bend. An adsorbent unit is disposed within the housing and includes first and second porous fabric adsorbent containers having inner and outer end portions. A connecting member connects the inner end portions of the first and second containers and is positioned between the first and second pipe portions spaced away from the return bend. A tab extends outwardly from the outer end portion of the first container and has an aperture therein that is force fit around the filter body. Unfortunately, the Riemenschneider adsorbent unit involves a more expensive and more complicated saddlebag unit. Furthermore, the filter body must be force fit through the aperture in the bag to fasten the bag within the housing, and it is not clear how the filter body is retained to the return bend.

In other examples, disclosed in U.S. Pat. Nos. 5,837,039 and 5,914,456 to LeConey et al., an adsorbent packet is adapted for positioning within a housing having a fluid flow tube having a pair of legs connected by a bight portion with a filter extending therefrom. The absorbent packet is formed with identical first and second pouches formed of tubular porous polyester felt material. Each of the pouches include sealed upper ends fused together to form an intermediate portion, and further include oppositely disposed sealed lower ends having apertures formed therein. The pouches are adapted for disposing the sealed lower ends in overlapping relation whereby the apertures thereof are in registry one over the other mounted snugly fit to the filter.

Similarly, U.S. Pat. No. 6,083,303 to LeConey et al. discloses an adsorbent packet for use in a canister having a tube disposed therein with a filter housing protruding therefrom. The filter housing includes a clasp portion circumscribing the tube and includes a flange and filter media portion extending integrally downwardly from the clasp portion. The adsorbent packet includes a flange portion having an opening therein defined by a rigid collar portion that is snap-fit to the filter media and flange portion of the filter housing. Unfortunately, the LeConey et al. references, especially the snap-fit arrangement of the '303 patent, require a tight fit between the apertures of the adsorbent packets and the enlarged flanges of the filter bodies that necessitates use of tight tolerances so that the apertures will not pass back over the enlarged flange once assembled. Additionally, the tight fits required by the LeConey et al. references present an ergonomic problem wherein an assembler must repeatedly exert significant force to snap-fit the adsorbent packet to the filter, thereby potentially leading to repetitive stress injuries. Finally, the difficulty in assembling the packet to the filter results in a higher process cycle time, thereby increasing manufacturing costs.

Accordingly, what is needed is a refrigerant vessel assembly having a desiccant bag therein that integrally fastens to a portion of a suction tube assembly. The desiccant bag economically assembles to the suction tube without the need for a close tolerance fit therebetween and without the need to force fit an aperture of the desiccant bag to another component so as to avoid repetitive stress injuries during assembly and to decrease cycle time of the manufacturing process to reduce costs.

BRIEF SUMMARY OF THE INVENTION

According to the present invention, a desiccant bag is provided for use in an accumulator of an air-conditioning system for an automotive vehicle. The accumulator is of the type that has a suction tube with an inlet leg, an outlet leg, and a bight portion therebetween. The bight portion of the suction tube has a pickup filter mounted thereto that has a clasp circumscribing the suction tube and has a filter body portion extending integrally from the clasp. The desiccant bag includes a fabric casing, a desiccant material sealed within the fabric casing, and a flexible flap extending from the fabric casing. The flexible flap includes an aperture therethrough such that the filter body portion of the pickup filter passes freely therethrough so that a portion of the flexible flap mounts to a portion of the clasp. The aperture may also define a locating edge at one end thereof for locating against a portion of the clasp of the pickup filter to hold the desiccant bag in position on the pickup filter while the fabric casing is tucked between the legs of the suction tube.

In another aspect of the present invention, an accumulator of an air conditioning system for an automotive vehicle is provided. The accumulator includes a suction tube that has an inlet leg, an outlet leg, and a bight portion between the inlet and outlet legs. A pickup filter is mounted to the bight portion of the suction tube and has a clasp circumscribing a portion thereof, with the clasp having a flange extending therefrom with flange teeth thereon. A body portion integrally extends from the clasp with a desiccant bag being mounted thereto. The desiccant bag includes a flap extending from one end thereof, with the flap having an aperture therethrough such that the filter body portion of the pickup filter passes freely therethrough so that a portion of the flexible flap mounts to a portion of the clasp. In several embodiments, the aperture may also define a locating edge at one end thereof for locating against a portion of the clasp of the pickup filter to hold the desiccant bag in position on the pickup filter while the fabric casing is tucked between the legs of the suction tube.

In a further aspect of the present invention, a method of assembling the desiccant bag within the accumulator is disclosed. The method includes the following steps: providing a suction tube having an inlet leg, an outlet leg, and a bight portion between the inlet and outlet legs; providing a pickup filter mounted to the bight portion of the suction tube, the pickup filter having a clasp circumscribing a portion of the bight portion and having a flange extending therefrom, the pickup filter further having a body portion connected with the clasp; providing a desiccant bag having a casing and a flap extending from one end of the casing, the flap having an aperture therethrough; locating the flap of the desiccant bag to a portion of the clasp of the pickup filter; pulling the desiccant bag such that the flap further locates to the clasp of the pickup filter; wrapping the desiccant bag around the bight portion of the suction tube such that the body portion of the pickup filer passes freely through the aperture; and tucking the desiccant bag between the inlet and outlet legs of the suction tube to further retain the desiccant bag in place within the accumulator.

Accordingly, it is an object of the present invention to allow greater dimensional variation between components, particularly between an aperture of a desiccant bag and a corresponding attachment feature on a suction tube, so as to reduce assembly time and cost. Therefore, there is no need for tight tolerances on components and tight fits between the components. Specifically, the present invention eliminates the need to forcibly snap fit a tab aperture of a desiccant bag over a sensitive pickup filter screen. Rather, a locating edge of the tab aperture firmly engages a portion of the clasp of the pickup filter and is pulled tightly thereagainst to assist in retaining the desiccant bag to the suction tube. The desiccant bag of the present invention is more completely retained to the suction tube when a casing of the bag is tucked between the legs of the suction tube.

It is another object of the present invention to immobilize a desiccant bag in the proper location between the legs of the J-tube in order to protect the bag from abrasion from rubbing against sidewalls of a housing, and to protect the bag from contact with the sidewalls and any associated heat that is generated during the manufacturing process.

It is still another object of the invention to provide an easily serviceable or replaceable self-retaining desiccant bag for an accumulator that does not require any external straps, ties, wires, or clips to retain the bag in place and does not require any specially cutout geometry to be embossed or formed in the fabric casing.

It is yet another object of the invention to provide an accumulator and self-retaining desiccant bag for use with a standard pickup filter.

It is a further object to provide a self-retaining desiccant bag for an accumulator that locates more positively to a pickup filter, and is more robust to staying in place in comparison to prior art designs.

It is still a further object to provide a self-retaining desiccant bag that does not require force fitting a filter through an aperture in the desiccant bag.

It is yet a further object to provide a self-retaining desiccant bag that is easier to assemble to an associated accumulator in order to reduce repetitive stress injury, reduce cycle time, and thereby reduce manufacturing costs to achieve a more economical accumulator.

These objects and other features, aspects, and advantages of this invention will be more apparent after a reading of the following detailed description and appended claims taken in conjunction with the accompanying drawings.

BRIEF DESCRIPTION OF THE SEVERAL VIEWS OF THE DRAWINGS

FIG. 3 is an enlarged perspective view of a portion of the present invention, showing a flap of the desiccant bag unlocked from a clasp of a pickup filter;

FIG. 4 is also an enlarged perspective view of the portion of the present invention of FIG. 3, showing the flap of the desiccant bag being curled over the clasp of the pickup filter;

FIG. 5 is a partial cross-sectional view of the portion of the present invention of FIG. 4 taken along lines 5—5 thereof and showing the flap of the desiccant bag interlocked with the clasp of the pickup filter;

FIG. 6A is an enlarged perspective view of a portion of the preferred embodiment of the present invention, showing the flap of the desiccant bag interlocked to a clasp of a preferred pickup filter;

FIG. 6B is a partial cross-sectional view of FIG. 6A;

FIG. 7 is a perspective view of a portion of the accumulator of FIG. 6A showing the desiccant bag initially located to the clasp of the preferred pickup filter;

FIG. 8 is a perspective view of a portion of the accumulator of Fig 6A showing the desiccant bag being wrapped clockwise with respect to a suction tube;

FIG. 9 is a perspective view of a portion of the preferred accumulator of FIG. 6A showing the casing of the desiccant bag being tucked between legs of the suction tube to more completely retain the desiccant bag within the accumulator;

FIG. 10 is a cross-sectional view of an alternate embodiment of the pickup filter of the present invention showing a clip portion extending curvilinearly along a clasp of the pickup filter;

DETAILED DESCRIPTION OF THE PREFERRED EMBODIMENT

In general, a desiccant bag assembled within an accumulator assembly is disclosed. While the present invention will be described below in detail with respect to accumulators of automotive vehicle air-conditioning systems, the present invention is also well suited to any other refrigeration system. Accordingly, the present invention is not limited to the automotive field. Further, though not shown in the figures included herewith but well known to one of ordinary skill in the art of refrigeration systems, a typical refrigeration system includes: a compressor, the output of which flows to a condenser through a liquid line with an orifice tube, then to an evaporator, and then to an accumulator, and finally back to the compressor.

Figure 2:
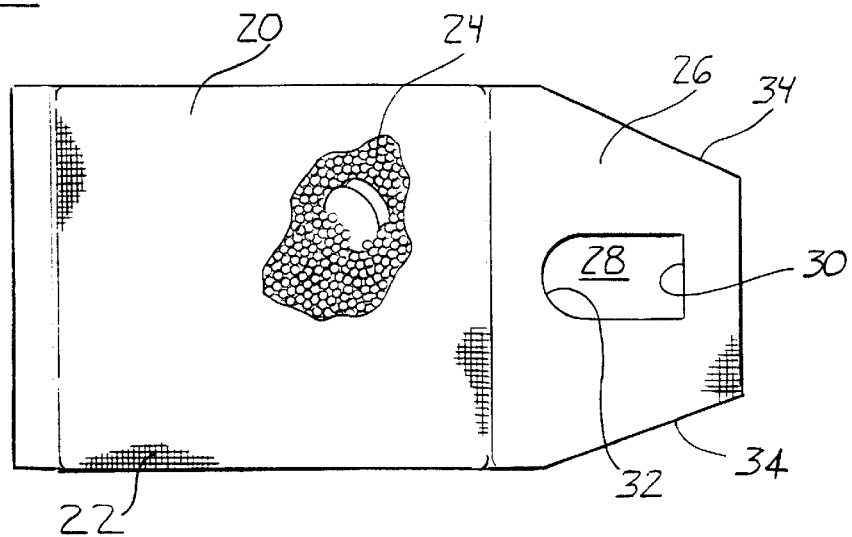
FIG. 2 is a plan view of a desiccant bag according to the preferred embodiment of the present invention, showing desiccant material and the thickness of the bag in broken view.

Referring now in detail to the Figures, there is shown in FIG. 2 a desiccant bag 20 according to the preferred embodiment of the present invention. The desiccant bag 20 includes a fabric pouch or casing 22, for containing loose desiccant material 24, as shown. The desiccant bag 20 may be constructed in accordance with any method known in the art, and from any material, such as a polyester felt. The loose desiccant material 24 may be composed of any type of adsorbent such as a silicate gel, alumino-silicate, alumina, calcium sulfate, activated charcoal, or any other desired compound in bead, pellet, or granular form. A flexible flap 26 extends longitudinally from the fabric casing 22 and includes an aperture 28 therethrough. The flexible flap 26 also includes a locating edge 30 at one side or end of the aperture 28 and includes a radius 32 at the end opposite the locating edge 30. It is preferred that the locating edge 30 be straight as shown, but it should be understood that any geometry might be used for the aperture 28. The flexible flap 26 further includes beveled edges 34 on opposite sides thereof.

Figure 1:
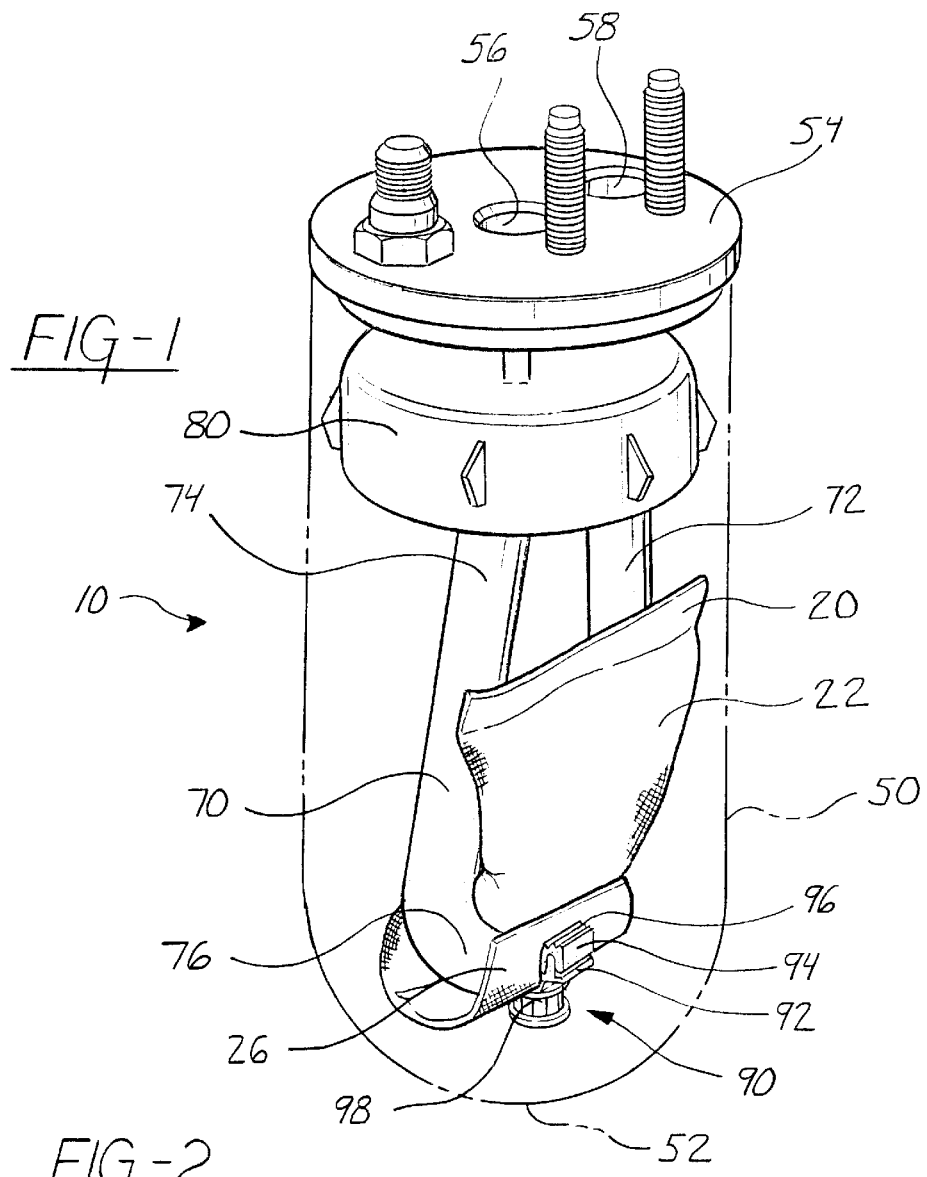
FIG. 1 is a perspective view of an accumulator according to an embodiment of the present invention.

FIG. 1 illustrates an accumulator 10 according to one embodiment of the present invention. The accumulator 10 includes a cylindrical housing 50 having a spun closed end 52, as shown in phantom line. A cover 54 is welded or otherwise sealingly connected to an end of the housing 50 opposite of the spun closed end 52. The cover 54 includes an inlet opening 56 and an outlet opening 58 therethrough. A J-shaped or U-shaped suction tube or conduit 70 includes an outlet leg 72 in communication with the outlet opening 58 of the cover 54, an inlet leg 74 in communication with the interior of the accumulator 10, and a bight 76 between the inlet and outlet legs 74 and 72. A baffle 80 is mounted between the cover 54 and the inlet leg 74 of the suction tube 70 to direct incoming refrigerant flow toward the inner surface of the housing 50. Accordingly, the inlet leg 74 is positioned directly underneath the baffle 80 to shield against refrigerant flow incoming through the inlet opening 56 of the cover 54.

An oil pickup tube and filter body assembly, a.k.a. a pickup filter 90, is mounted to the suction tube 70 at the bight 76 thereof, as is well known in the art. As best shown in FIG. 5, the pickup filter 90 has a clamp or clasp 92 that circumscribes the bight 76 of the suction tube 70, and has a filter body or screen body 98 extending integrally in a downward direction from the clasp 92. The clasp 92 includes a flange 94 extending transversely from the longitudinal axis of the screen body 98 and including serrations or flange teeth 96 thereon. The flange teeth 96 may take the form of a single projection, a sloped surface, or any other similar feature and are not limited to only serration types of features. Any pickup filter 90 may be used with the present invention, as will be apparent to those skilled in the art.

Referring again to FIG. 1, the fabric casing 22 of the desiccant bag 20 is sandwiched between the inlet and outlet legs 74 and 72 of the suction tube 70. The desiccant bag 20 also includes the flexible flap 26 that extends from the fabric casing 22. The flexible flap 26 mounts around the pickup filter 90 and fixedly secures the desiccant bag 20 in place to the suction tube 70.

FIG. 3 illustrates wrapping the flexible flap 26 of the desiccant bag 20 freely over the screen body 98 (not shown in FIG. 1) and in position, ready to be engaged with the clasp 92 of the pickup filter 90 (shown in FIG. 1). As shown, the flexible flap 26 is in a free state and is unlocked from the clasp 92 of the pickup filter 90 and the fabric casing 22 is tucked between the outlet and inlet legs 72 and 74 of the suction tube 70. FIG. 4 illustrates the flexible flap 26 of the desiccant bag 20 curled, from its state of rest as shown in FIG. 3, upward over the clasp 92 of the pickup filter 90 so that the locating edge 30 of the flexible flap 26 is engageable with the flange teeth 96 of the clasp 92. FIG. 5 illustrates the flexible flap 26 fully mounted to the pickup filter 90 where the locating edge 30 of the flexible flap 26 is registered in the flange teeth 96 of the clasp 92 such that the flexible flap 26 is interlocked therewith. Accordingly, the flexible flap 26 is interlocked to the clasp 92 and the fabric casing 22 is sandwiched within the legs of the suction tube 70 to integrally fasten the desiccant bag 20 to the suction tube 70. Thus, the desiccant bag 20 can be characterized as a self-retaining component.

FIGS. 6A and 6B illustrate a portion of an accumulator 110 according to the preferred embodiment of the present invention wherein a pickup filter 190 has a clasp 192 that circumscribes the bight 76 of the suction tube 70, and has a screen portion or filter body 198 extending integrally downwardly from the clasp 192. The filter body 198 includes a flange or shoulder 198a proximate the clasp 192 and a screen 198b disposed on the other side of the shoulder 198a away from the clasp 192. The clasp 192 includes a flange 194 extending transversely from the longitudinal axis of the filter body 198 and the flange 194 has flange teeth 196 thereon. Preferably, the flange 194 includes a projection 195 extending upwardly therefrom. The projection 195 traps the flexible flap 26 so that the flexible flap 26 will not slip off the flange 194 when the locating edge 30 of the flexible flap is contiguous or mounted against the flange 194. Accordingly, the flexible flap 26 is interlocked to the clasp 192 and the fabric casing 22 is sandwiched between the legs of the suction tube 70 to integrally fasten the desiccant bag 20 to the suction tube 70.

FIGS. 7 through 9 illustrate a preferred method of assembling the accumulator 110 that includes the following steps: providing the above-mentioned hardware incorporating the preferred pickup filter 190 of FIGS. 6A and 6B; placing the flexible flap 26 of the desiccant bag 20 over the clasp 192 of the pickup filter 190 between the projection 195 and the inlet and outlet tubes 74 and 72 of the suction tube 70 so that the locating edge 30 of the flexible flap 26 is registered in the flange teeth 196 (shown in FIG. 6B) of the clasp 192 of the pickup filter 190; wrapping the desiccant bag 20 around the bight 76 of the suction tube 70 such that the aperture 28 of the flexible flap 26 of the desiccant bag 20 locates over the filter body 198 of the pickup filter 190; and tucking the fabric casing 22 of the desiccant bag 20 between the inlet and outlet legs 74 and 72 to integrally fasten the desiccant bag 20 within the accumulator 110. These steps can be performed in any other order if desired.

Figure 11:
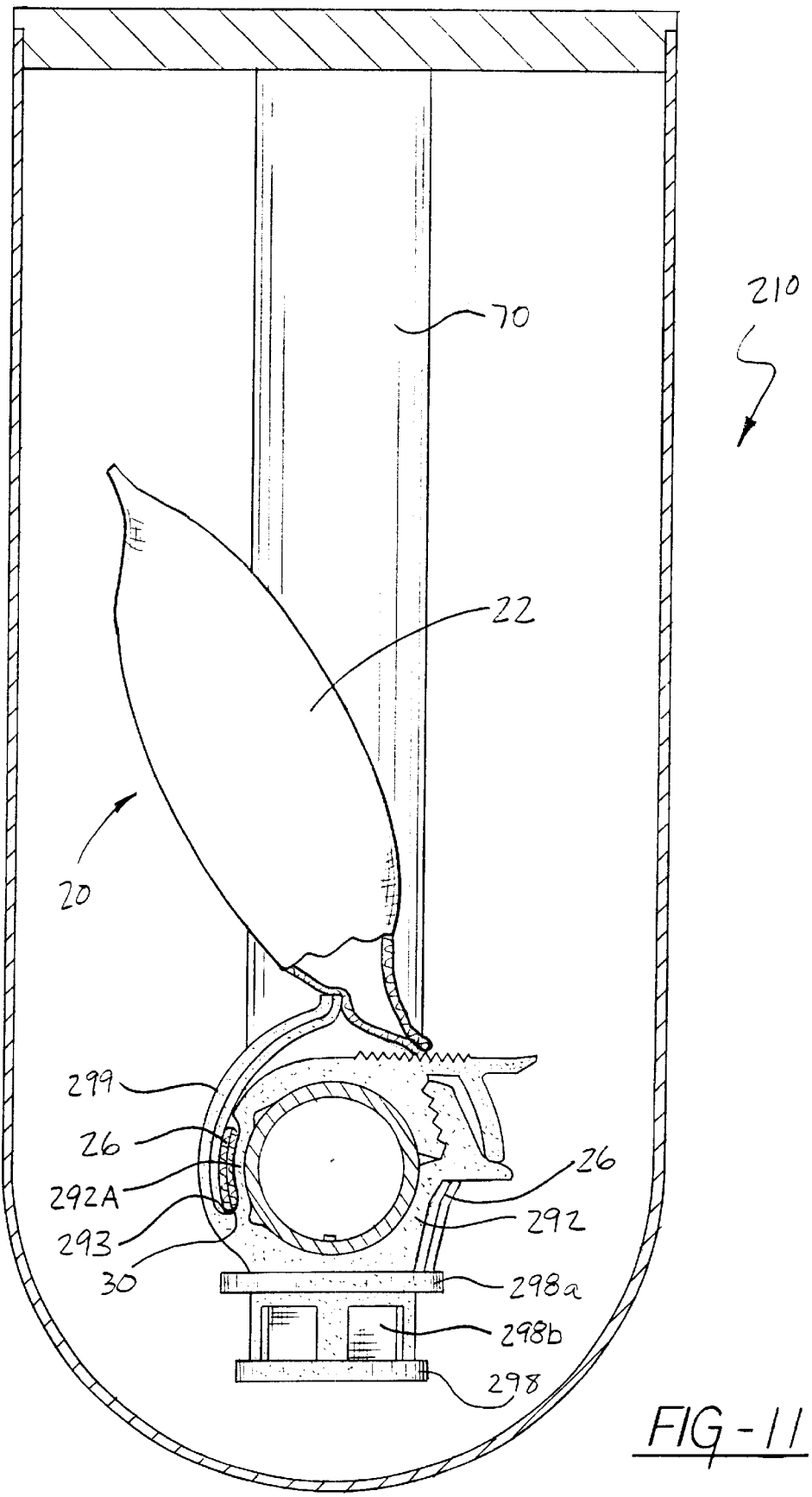
FIG. 11 is a side view of an alternate embodiment of the accumulator of the present invention showing the flexible flap of the desiccant bag retained to the clasp of the pickup filter of FIG. 10.

FIGS. 10 and 11 illustrate another embodiment of the present invention. FIG. 10 shows an alternative pickup filter 290 that has a clasp 292 and a screen portion or filter body 298 extending integrally downwardly from the clasp 292. The filter body 298 includes a shoulder 298a proximate the clasp 292 and a screen 298b disposed on the other side of the shoulder 298a away from the clasp 292. The clasp 292 includes a flange 294 extending transversely from the longitudinal axis of the filter body 298. A resilient integral arm or clip 299 is disposed substantially opposite of the flange 294 and extends curvilinearly along one adjacent side of the clasp 292 from a land 293 between the filter body 298 and one side of the clasp 292.

As shown in an accumulator 210 depicted in FIG. 11, the clip 299 effectively traps the flexible flap 26 of the desiccant bag 20 between the clip 299 and an adjacent side 292A of the clasp 292. Due to the resiliency of the clip 299, the flexible flap 26 fits between the clip 299 and the adjacent side 292A of the clasp 292 under an interference fit condition so that the flexible flap 26 will not slip off the clasp 292 when the locating edge 30 of the flexible flap 26 is contiguous or mounted thereto. The flexible flap 26 is first placed over the clasp 292 such that the filter body 298 and clasp 292 of the pickup filter 290 extend freely through the aperture (not shown) in the flexible flap 26. One end of the flexible flap 26 is then slipped over the clip 299, located between the clip 299 and the adjacent side 292A of the clasp 292, and pulled with respect thereto such that the locating edge 30 locates against the land 293 of the clasp 292. The fabric casing 22 of the desiccant bag 20 is then wrapped around and tucked between the legs of the suction tube 70. Accordingly, the flexible flap 26 is interlocked to the clasp 292 and the fabric casing 22 is sandwiched within the legs of the suction tube 70 to integrally fasten the desiccant bag 20 to the suction tube 70.

Figure 12:
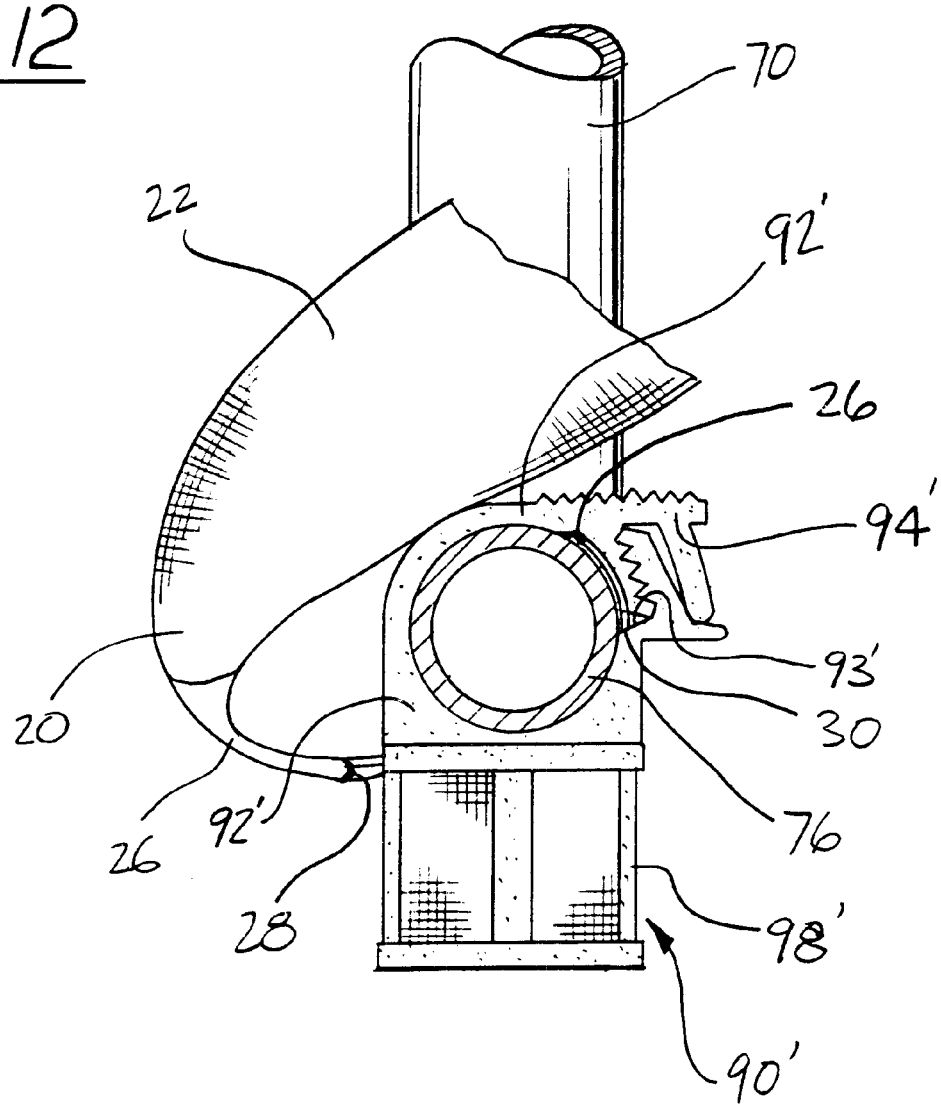
FIG. 12 is a partial cross-sectional view of an alternative embodiment of the present invention, showing the flap of the desiccant bag mounted to an interior portion of the clasp.

Referring now to the alternative embodiment of FIG. 12, a pickup filter 90' is disclosed that is slightly modified from the pickup filter 90 of FIG. 5. It is contemplated, however, that the pickup filter of FIG. 5 can be adapted for use with the alternative fastening arrangement of FIG. 12. In any case, the pickup filter 90' has a clasp 92' that circumscribes the bight 76 of the suction tube 70, and has a screen body 98' extending downward from the clasp 92'. The clasp 92' includes a flange 94' extending transversely from the longitudinal axis of the screen body 98'. As before, the fabric casing 22 of the desiccant bag 20 is sandwiched between the inlet and outlet legs 74 and 72 of the suction tube 70. The desiccant bag 20 also includes the flexible flap 26 that extends from the fabric casing 22.

The flexible flap 26 mounts to the clasp 92' of the pickup filter 90', wherein a portion of the flexible flap 26 is entrapped between the clasp 92' and the suction tube 70. The clasp 92' of the pickup filter 90' has an internal land portion 93', and the flexible flap 26 of the desiccant bag 20 has a locating edge 30 defined by a portion of the aperture 28. The flexible flap 26 mounts to the clasp 92' with the locating edge 30 being located against the internal land portion 93' between the clasp 92' and the suction tube 70. This is accomplished with the following steps: assembling the pickup filter 90' to the suction tube 70 with the clasp 92' open; locating the locating edge 30 of the desiccant bag 20 to the internal land portion 93'; closing or interlocking the clasp 92' together over the flexible flap 26; and wrapping the desiccant bag 20 between the legs of the suction tube 70. Thus, it is possible to use a standard "off the shelf" pickup filter with the desiccant bag 20 of the present invention to achieve an inherent and integral fastening arrangement.

From the above, it can be appreciated that a significant advantage of the present invention is that, in contrast with the prior art, greater tolerances between the aperture of the desiccant bag and the pickup filter may be used. Greater tolerances permit easier manufacture of the components, which necessarily results in less expensive components.

Additionally, the aperture may include a tolerance of up to plus or minus five millimeters, in contrast with the prior art aperture that requires plus or minus 0.25 millimeters. This twenty-fold increase in tolerance is possible because the fastening arrangement of the present invention is not dependent upon a diametric interference fit, as with the LeConey et al. references. There, the diametric interference fit must be toleranced very tightly such that the aperture of the flexible flap will not easily pass back over the periphery of the flange of the pickup filter after it has been assembled. With the present invention, a diametric interference fit fastening arrangement is not used. Instead, an edge locating and interlocking type of fit is used, which is inherently more forgiving in terms of tolerances required. Only one edge of the aperture is relied upon for interlocking the flap to the pickup filter. Thus, the location of that edge, in contrast with an overall opening dimension of the aperture, is all that need be controlled in production thereof. Therefore, the exact location of the edge may vary greatly and will not detrimentally affect the fastening of the desiccant bag to the suction tube. In contrast, the opening dimension of the apertures of the prior art may not vary similarly, and indeed must be controlled very closely with very tight tolerances.

While the present invention has been described in terms of a preferred embodiment, it is apparent that other forms could be adopted by one skilled in the art. For example, the exact geometry of the flap and the aperture may be varied as well as the geometry of the corresponding flange of the clasp of the pickup filter. An example of an oil pickup filter similar to the pickup filter of the present invention is disclosed in U.S. Pat. No. 5,970,738 and is incorporated by reference herein. Accordingly, the scope of the present invention is to be limited only by the following claims.

What is claimed is:

1. A desiccant bag adapted for use in an accumulator of an air-conditioning system, said accumulator having a suction tube with an inlet leg, an outlet leg, and a bight therebetween, said bight of said suction tube having a pickup filter mounted thereto, said pickup filter having a clasp and a filter body integrally extending from said clasp, said desiccant bag comprising:

a casing;

a desiccant material contained within said casing; and a flexible flap extending from said casing, said flexible flap having an aperture therethrough, said flexible flap further having a locating edge along periphery and at one end of said aperture;

whereby said aperture of said flexible flap is mounted over said filter body of said pickup filter, and said locating edge of said flexible flap locates against a portion of said clasp of said pickup filter to locate and hold said desiccant bag in position on said pickup filter.

2. The desiccant bag as claimed in claim 1, wherein a portion of said casing is tucked between said inlet and outlet legs of said suction tube, such that said casing does not require an external fastening device to immobilize said desiccant bag.

3. The desiccant bag as claimed in claim 1, wherein said aperture of said flexible flap can be toleranced at least plus/minus five millimeters.

4. An accumulator for an air-conditioning system, said accumulator comprising:

a suction tube having an inlet leg, an outlet leg, and a bight between said inlet leg and said outlet leg;

a pickup filter mounted to said bight of said suction tube, said pickup filter having a clasp circumscribing a portion of said bight, said clasp having a flange extending therefrom having a plurality of flange teeth thereon, said pickup filter further having a filter body integrally extending from said clasp; and a desiccant bag mounted to said pickup filter, said desiccant bag having a flap extending from one end thereof with an aperture therethrough, said flap having a locating edge at one end of said aperture, said aperture of said desiccant bag being mounted over said filter body of said pickup filter with said locating edge of said flap contiguous said flange of said pickup filter and registered in said plurality of flange teeth of said flange to locate and retain said desiccant bag in position on said pickup filter.

5. The accumulator as claimed in claim 4, wherein a portion of said desiccant bag is tucked between said inlet leg and said outlet leg of said suction tube such that said desiccant bag does not require any external fastening device to immobilize said desiccant bag.

6. The accumulator as claimed in claim 4, wherein said aperture of said desiccant bag can be toleranced at least plus/minus five millimeters.

7. An accumulator for an air-conditioning system, said accumulator comprising:
  a suction tube having an inlet leg, an outlet leg, and a bight between said inlet leg and said outlet leg;
  a pickup filter mounted to said bight of said suction tube, said pickup filter having a clasp circumscribing a portion of said bight, said clasp having a flange extending therefrom, said flange having a projection extending therefrom, said pickup filter further having a filter body integrally extending from said clasp; and
  a desiccant bag mounted to said pickup filter, said desiccant bag having a flap extending from one end thereof with an aperture therethrough, said flap having a locating edge at one end of said aperture, said aperture of said desiccant bag being mounted over said pickup filter with said locating edge of said flap contiguous said flange of said pickup filter and trapped behind said projection of said flange to locate and retain said desiccant bag in position on said pickup filter.

8. The accumulator as claimed in claim 7, wherein a portion of said desiccant bag is tucked between said inlet leg and said outlet leg of said suction tube such that said desiccant bag does not require any external fastening device to immobilize said desiccant bag.

9. The accumulator as claimed in claim 7, wherein said aperture of said desiccant bag can be toleranced at least plus/minus five millimeters.

10. An accumulator for an air-conditioning system, said accumulator comprising:
  a suction tube having an inlet leg, an outlet leg, and a bight between said inlet leg and said outlet leg;
  a pickup filter mounted to said bight of said suction tube, said pickup filter having a clasp circumscribing a portion of said bight, said clasp having a flange extending therefrom, said pickup filter further having a filter body integrally extending from said clasp, said clasp further having an integral clip extending curvilinearly along a portion of said clasp on a side opposite of said flange; and
  a desiccant bag mounted to said pickup filter, said desiccant bag having a flap extending from one end thereof with an aperture therethrough, said flap having a locating edge at one end of said aperture, said aperture of said desiccant bag being mounted over said filter body of said pickup filter with said locating edge of said flap located against a portion of said clasp and entrapped thereto by said clip of said pickup filter to locate and retain said desiccant bag in position on said pickup filter.

11. The accumulator as claimed in claim 10, wherein a portion of said desiccant bag is tucked between said inlet leg and said outlet leg of said suction tube such that said desiccant bag does not require any external fastening device to immobilize said desiccant bag.

12. The accumulator as claimed in claim 10, wherein said aperture of said desiccant bag can be toleranced at least plus/minus five millimeters.

13. A method of assembling a desiccant bag within an accumulator, said method comprising the steps of:
  providing a suction tube having an inlet leg, an outlet leg, and a bight between said inlet leg and said outlet leg;
  providing a pickup filter mounted to said bight of said suction tube, said pickup filter having a clasp circumscribing a portion of said bight and having a flange extending therefrom, said pickup filter further having a filter body integrally extending from said clasp;
  providing a desiccant bag having a casing and a flap extending from one end of said casing, said flap having an aperture therethrough;
  locating said flap to a portion of said clasp of said pickup filter;
  pulling said desiccant bag to further locate said flap against said portion of said clasp of said pickup filter; and
  wrapping said desiccant bag around said bight of said suction tube such that said filter body of said pickup filter freely passes through said aperture of said flap of said desiccant bag.

14. The method as claimed in claim 13 further comprising the step of tucking said desiccant bag between said inlet leg and said outlet leg of said suction tube to further retain said desiccant bag in place within said accumulator.

15. An oil pickup filter adapted for attachment to a conduit and for cooperation with a flexible flap of a desiccant bag, said oil pickup filter comprising:
  a clasp engaging an outer diameter of said conduit for securing said oil pickup filter to said conduit, said clasp comprising a flange portion having a projection extending away from said flange portion, said projection being adapted for trapping said flexible flap of said desiccant bag; and
  a filter body integral with said clasp and extending in a direction away from said clasp, said filter body having an integral screen portion extending in a direction away from said clasp.

16. An oil pickup filter adapted for attachment to a conduit and for cooperation with a flexible flap of a desiccant bag, said oil pickup filter comprising:
  a clasp engaging an outer diameter of said conduit for securing said oil pickup filter to said conduit, said clasp comprising an integral clip extending curvilinearly along one side of said clasp; and
  a filter body integral with said clasp and extending in a direction away from said clasp, said filter body having an integral screen portion extending in a direction away from said clasp.

17. An accumulator for an air-conditioning system, said accumulator comprising:
  a suction tube having an inlet leg, an outlet leg, and a bight between said inlet leg and said outlet leg;
  a pickup filter mounted to said bight of said suction tube, said pickup filter having a clasp circumscribing said bight, said pickup filter further having a filter body extending in a direction away from said clasp; and
  a desiccant bag mounted to said clasp of said pickup filter, said desiccant bag having a flap extending from one end thereof with an aperture therethrough, said flap having a locating edge at one end of said aperture, said filter body extending through said aperture and a portion of said flap being mounted to said clasp of said pickup filter to retain said desiccant bag in position in said accumulator.

18. The accumulator as claimed in claim 17, wherein said clasp of said pickup filter comprises a flange extending therefrom, said flange having a plurality of flange teeth thereon, said flap of said desiccant bag having a locating edge defined by a portion of said aperture, said flap mounting to said clasp with said locating edge registered in said plurality of flange teeth.

19. The accumulator as claimed in claim 17, wherein said clasp of said pickup filter comprises a flange extending therefrom, said flange having a projection extending therefrom, said flap mounting to said clasp with said locating edge located against a portion of said flange behind said projection.

20. The accumulator as claimed in claim 17, wherein said clasp of said pickup filter comprises a clip integrally extending curvilinearly along a portion of said clasp, said flap of said desiccant bag having a locating edge defined by a portion of said aperture, said flap mounting to said clasp with said locating edge located against a portion of said clasp between said clip and said clasp.

21. The accumulator as claimed in claim 17, wherein a portion of said flap is entrapped between said clasp and said suction tube.

22. The accumulator as claimed in claim 21, wherein said clasp of said pickup filter comprises an internal land portion, said flap of said desiccant bag having a locating edge defined by a portion of said aperture, said flap mounting to said clasp with said locating edge located against said internal land portion between said clasp and said suction tube.

* * * * *

UNITED STATES PATENT AND TRADEMARK OFFICE
CERTIFICATE OF CORRECTION

PATENT NO.   : 6,481,241 B1
DATED        : November 19, 2002
INVENTOR(S)  : John Dale Fisk and Stephen Troy Schroder It is certified that error appears in the above-identified patent and that said Letters Patent is hereby corrected as shown below:

Column 8,
Line 66, please delete "from" and insert -- at --.

Column 9,
Lines 27 and 57, please delete "from" and insert -- at --.
Line 63, after "said" first occurrence, kindly insert -- integral --.

Column 10,
Line 67, please delete "from" and insert -- at --.

Signed and Sealed this

Twenty-fifth Day of March, 2003

JAMES E. ROGAN
*Director of the United States Patent and Trademark Office*